United States Patent [19]
Klingelhofer

[11] 3,823,440
[45] July 16, 1974

[54] HINGE FITTING FOR SEATS WITH ADJUSTABLE BACKREST, ESPECIALLY AUTOMOTIVE VEHICLE SEATS

[75] Inventor: Gerd Klingelhofer, Remscheid, Germany

[73] Assignee: Fritz Keiper, Remscheid-Hasten, Germany

[22] Filed: June 6, 1973

[21] Appl. No.: 367,423

[30] Foreign Application Priority Data
June 7, 1972  Germany.......................... 2227680

[52] U.S. Cl.................. 16/139, 16/140, 297/373, 297/374, 297/379, 74/531, 16/144
[51] Int. Cl............................................ E05d 11/10
[58] Field of Search ............. 16/139, 140, 144, 143; 297/366, 376, 379; 74/531, 804, 805

[56] References Cited
UNITED STATES PATENTS

| | | | |
|---|---|---|---|
| 3,328,079 | 6/1967 | Byczkowski | 16/144 X |
| 3,352,176 | 11/1967 | Brundage | 74/804 X |
| 3,401,979 | 9/1968 | Putsch | 297/366 X |
| 3,423,785 | 1/1969 | Pickles | 297/374 X |
| 3,478,623 | 11/1969 | Noguchi | 74/804 X |
| 3,523,593 | 8/1970 | Karasick | 297/374 X |
| 3,562,851 | 2/1971 | Koller | 16/140 |

Primary Examiner—Francis K. Zugel
Assistant Examiner—Peter A. Aschenbrenner
Attorney, Agent, or Firm—Michael S. Striker

[57] ABSTRACT

A hinge fitting for a seat, especially a motor vehicle seat, having a backrest pivotally adjustable with respect to the seat portion, in which adjusting means connect a hinge member fixed to the backrest and another hinge member fixed to the seat portion for pivotal movement with respect to each other. The adjusting means comprise an internally toothed ring gear connected to one of the hinge members, a spur gear meshing with the ring gear and connected to the other of said hinge members and having an outer diameter smaller by at least the height of one tooth than the root diameter of the gear ring, eccentric means including a pin fixed to one of the gears and an eccentric bysing cooperating with the other of the gears and mounted on the pin turnable and axially movable with respect thereto, and means connected to the bushing for moving the same in axial direction between a first position in which the bushing substantially prevents turning of the other gear relative to the pin and therewith to the one gear fixed to the pin, and a second position in which the bushing can turn freely with respect to the pin and permits turning of the gears relative to each other.

18 Claims, 4 Drawing Figures

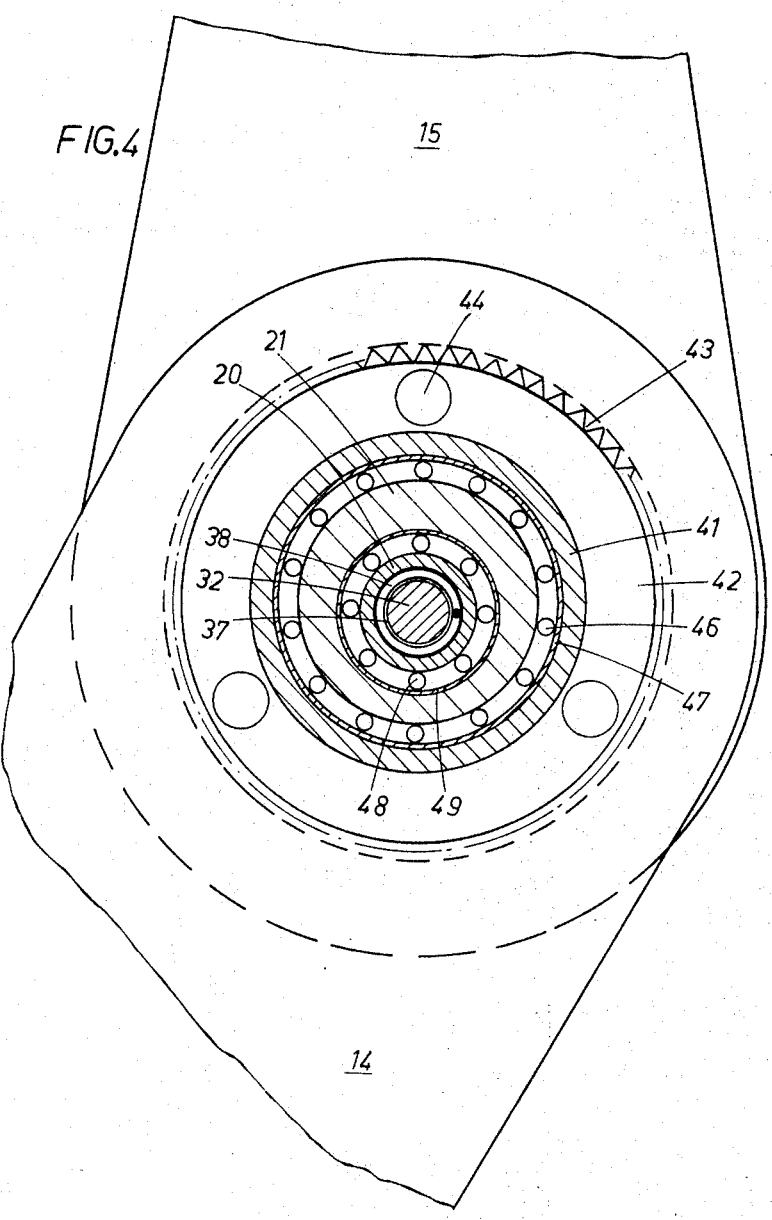

HINGE FITTING FOR SEATS WITH ADJUSTABLE BACKREST, ESPECIALLY AUTOMOTIVE VEHICLE SEATS

BACKGROUND OF THE INVENTION

The present invention relates to a hinge fitting for seats with adjustable backrests, especially for automotive vehicle seats, in which a stationary hinge part is fixed to the seat portion and a tiltable hinge part to the backrest and connected to the stationary hinge part by means of at least one gear ring and a spur gear engaged therewith, in which the outer or addendum dimeter of the spur gear is at least smaller by the height of one tooth than the root diameter of the gear ring and in which the two gear components are provided with a number of teeth different from each other, and an eccentric having an eccentricity equal substantially to the difference between the root diameter of the gear ring and the outer diameter of the spur gear.

Such hinge fittings are known in the art and in one known hinge fitting of this type it is possible to steplessly adjust the backrest with regard to the seat portion by turning the eccentric which cooperates with the ring gear and the spur gear, whereby in this known construction additional locking means for locking the two hinge parts in the adjusted position are not necessary. However, in this known construction it is necessary to turn the eccentric several times, during adjustment of the backrest through a large angle with respect to the seat portion, so that the backrest adjustment will cause considerable efforts of the user.

Another hinge fitting of the aforementioned type is known in which the eccentric is axially movable out of engagement with the gears so that in the axially moved position of the eccentric, a fast adjustment of the hinge fitting by acting on the backrest can be carried out. This known hinge fitting has, however, the decisive disadvantage that the eccentric can be moved back into engagement with the gears only in a definite position of the latter so that the necessary locking of the hinge parts, after adjustment of the backrest, will be problematic since this definite position of the two gears with respect to each other will not necessarily be obtained in any adjusted position of the backrest. Therefore, since the eccentric, after the desired adjustment of the backrest has been made, can in many cases not be pushed back into the locking position, it may happen that, when the user, after adjustment of the backrest, sits down on the seat and leans against the backrest, the latter will still turn to a certain angle, which may have dangerous effects, especially when the seat is a driver's seat in a motor vehicle.

SUMMARY OF THE INVENTION

It is an object of the present invention to provide a hinge fitting of the aforementioned kind for a seat with adjustable backrest which permits to adjust the backrest quickly by directly applying a force thereto and which assures that the backrest in any adjusted position will be securely and positively locked without any delay.

It is a further object of the present invention to provide a hinge fitting of the aforementiond kind which is composed of relatively few and simple parts so that the hinge fitting may be constructed at reasonable cost and will stand up properly under extended use.

With these and other objects in view, which will become apparent as the description proceeds, the hinge fitting according to the present invention for seats, especially for seats of automotive vehicles, mainly comprises a first hinge part adapted to be fixed to the seat portion of the seat, a second hinge part adapted to be fixed to the backrest of the seat tiltable with respect to the first hinge part, an internally toothed ring gear fixed to one of the hinge parts, a spur gear extending through the ring gear in engagement therewith and fixed to the other hinge part, in which the teeth of the spur gear have an addendum circle of a diameter which is smaller by at least the height of one tooth than the diameter of the root circle of the teeth of the ring gear and in which the number of teeth of one gear differ from the number of the other gear, eccentric means cooperating with the gears and comprising a pin fixed to one of the gears and an eccentric bushing mounted on the pin turnable and slidable in axial direction and cooperating with the other gear, and means connected to the eccentric bushing for moving the same in axial direction between a first bearing region with increased resistance against turning and a second bearing position with reduced resistance against turning. With a hinge fitting constructed in this manner it is possible to obtain, when the eccentric bushing is in the bearing region with reduced resistance against turning, a free rolling movement of the gear gears relative to each other and therewith a free tilting movement of the hinge parts relative to each other, whereby the eccentric bushing is continuously taken along since it can, in this bearing region, turn easily with respect to the pin as well as with respect to the gear cooperating therewith. Since the eccentric bushing is continuously taken along during the eccentric movement of the gears during their rolling movement with respect to each other, the eccentric bushing will be positioned at each instant in such a manner that it can be returned into the bearing region of increased resistance against turning, in which a relative movement of the bushing relative to the gear coordinated therewith, respectively, relative to the other gear which is connected to the pin is not possible any longer, so that an immediate locking of the rolling movement of the gears with respect to each other and therewith a blocking of the hinge parts of the hinge fitting will be assured. A delay of movement of the eccentric bushing into the bearing region with increased friction, and therewith a delay of locking of the hinge parts is therewith excluded. By selecting the dimension of the two gears and the eccentricity of the bushing in the manner as mentioned above, it is possible to adjust the hinge parts by turning of the eccentric after the eccentric bushing has been moved into the bearing region with increased resistance against turning, however, a tilting of the backrest by acting directly thereon is impossible.

To assure a proper function of the hinge fitting with a simple construction, it is advisable to provide for the first bearing region a cylindrical opening in the other gear engageable by the outer periphery of an end portion of the eccentric bushing and for the second bearing region a pair of friction reducing bearings, such as sleeve or roller bearings, respectively connected to the spur gear and the bushing and respectively engaged by the outer periphery of a portion of the bushing adjacent the end portion thereof and the outer periphery of a portion of the pin. By the arrangement of the bearings for the second bearing region, it is possible to reduce the bearing resistance to such an extent that a turning of the eccentric bushing relative to the gear coordinated therewith and the pin, and therewith a release of the hinge parts will be possible. On the other hand, it is sufficient for the locking of the hinge parts in any adjusted position to move the end portion of the bushing into the aforementioned opening provided in the spur gear to thus assure a tight engagement with the spur gear and the pin, to thereby increase the frictional resistance between these parts, to thus prevent turning of the eccentric bushing so that even large forces acting on the hinge parts will not make an adjustment of the latter relative to each other possible. One of the bearings is preferably mounted on a bearing housing which is connected to the spur gear axially projecting therefrom. The bearing housing preferably has a radially outwardly projecting flange fixed within a collar provided on the hinge part connected to the spur gear so that the position of the one bearing relative to the spur will be properly established. To assure a proper function of the hinge fitting in the locked position as well as in the released position, it is further advisable to separate the two bearing regions axially from each other for a distance which is greater than the length of the respective bearing portions of the eccentric bushing so that the eccentric bushing, when moved into one of the bearing regions, will be completely disconnected from the other bearing region. For this purpose, it is advantageous to provide on the eccentric bushing axially displaced and radially offset bearing sections for the bearing regions of different resistance against turning so that the end positions of the eccentric bushing relative to the bearing regions may be positively established. This can be obtained in a simple manner by increasing the cross-section of the bearing section of the eccentric bushing for the bearing region with reduced friction with regard to the bearing portion of the bushing for the bearing region of increased friction under forming of an abutment shoulder between the two sections of the bushing.

In order to facilitate movement of the eccentric bushing from one to the other bearing region, it is advantageous to chamfer the corresponding sections of the bushing at opposite ends. If in the bearing region of reduced friction, roller bearings are used, then it is also advisable to provide for the rollers of the outer bearing a roller cage connected to the aforementioned bearing housing and to provide for the inner bearing a roller cage which is connected to the inner surface of the bushing.

To move the eccentric bushing between the two bearing regions for adjusting, respectively blocking the backrest which is connected to the seat portion by the hinge fitting, the eccentric bushing is preferably bell-shaped and has an end wall extending transverse to the axis of the pin at the end of the bushing facing away from the gears and preferably formed with an opening coaxial with the pin, and a shifting bolt extending through the opening is connected at one end to the end wall whereas an actuating member is connected to the other end of the shifting bolt for shifting the latter and the bushing connected thereto in axial direction. The actuating member may be in the form of a push or pull button or eventually in the form of an actuating lever. To assure that the shifting bolt is only movable in axial direction and to prevent exertion of any radial forces by the shifting bolt on the eccentric bushing during the adjustment, it is advantageous to form the pin of the eccentric hollow, to arrange the shifting bolt in the interior of the hollow pin with an end portion thereof extending beyond the latter and to provide connecting means connecting the end portion of the shifting bolt to the eccentric bushing turnable with respect thereto and for movement in axial direction therewith. This will assure that the shifting bolt will not turn during turning of the eccentric bushing and that therefore the actuating member may be held by the operator in any position. To prevent accidental movement of the eccentric bushing into the bearing retion with reduced friction and therewith an undesired adjustment of the backrest, it is advantageous to provide biasing means, preferably acting on the shifting bolt, for biasing the eccentric bushing toward the bearing region with increased friction so that the eccentric bushing, when no outside force acts on the shifting bolt, will be automatically held, respectively moved to the locking position. For this purpose, the hollow pin of the eccentric is preferably formed with an elongated chamber extending about a portion of the shifting bolt and the aforementioned biasing means may comprise a coil compression spring in this chamber about the shifting bolt and abutting with opposite ends respectively against a radially inwardly extending shoulder face formed by the pin at one end of the chamber and against a radially outwardly extending shoulder face on the shifting bolt.

The pin of the eccentric projects preferably with an end portion thereof beyond the ring gear and is provided at this end portion with a radially outwardly extending annular flange which is connected to this gear by a weld seam. By abutting the aforementioned annular flange onto the outer surface of the gear coordinated therewith the position of the pin relative to this gear is established in a simple manner during the assembly.

The pin of the eccentric is preferably connected with the gear fixed to the movable hinge part, whereas the eccentric bushing cooperates with the gear fixed to the stationary hinge part. It is further advantageous to connect the ring gear to the movable fitting part of the spur gear to the stationary fitting part.

The novel features which are considered as characteristic for the invention are set forth in particular in the appended claims. The invention iteslf, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a cross-section taken along the line IV—IV of FIG. 2, but showing the various elements of the fitting in a position permitting the adjustment of the two link parts relative to each other.

DESCRIPTION OF THE PREFERRED EMBODIMENTS

Figure 1:
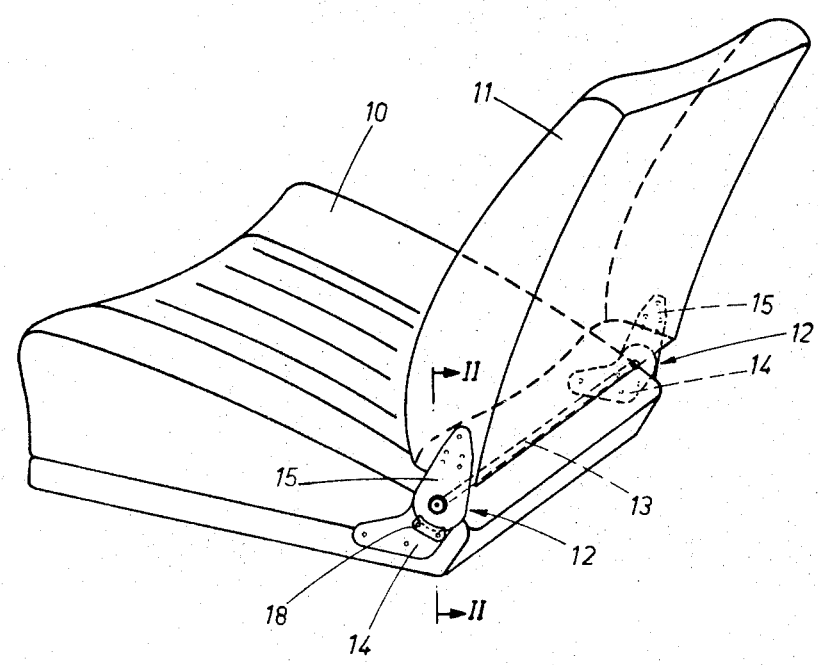
FIG. 1 is a schematic perspective view of a seat provided with hinge fittings according to the present invention.

FIG. 1 illustrates a seat for an automotive vehicle having a seat portion 10 and a tiltable backrest 11 connected at opposite sides to the seat portion by hinge fittings 12. While the hinge fittings 12 according to the present invention are, due to their compact construction, especially suitable for use in automotive vehicle seats, such hinge fittings can also be used in any other seat in which the backseat is tiltably connected to the seat portion. In the seat illustrated in FIG. 1, the two hinge fittings 12 are connected to each other by a connecting rod 13 so that the hinge fittings are operable in synchronism. It is, however, also possible to operate the hinge fittings separately or to provide a seat with only one or more than two hinge fittings.

Figure 2:
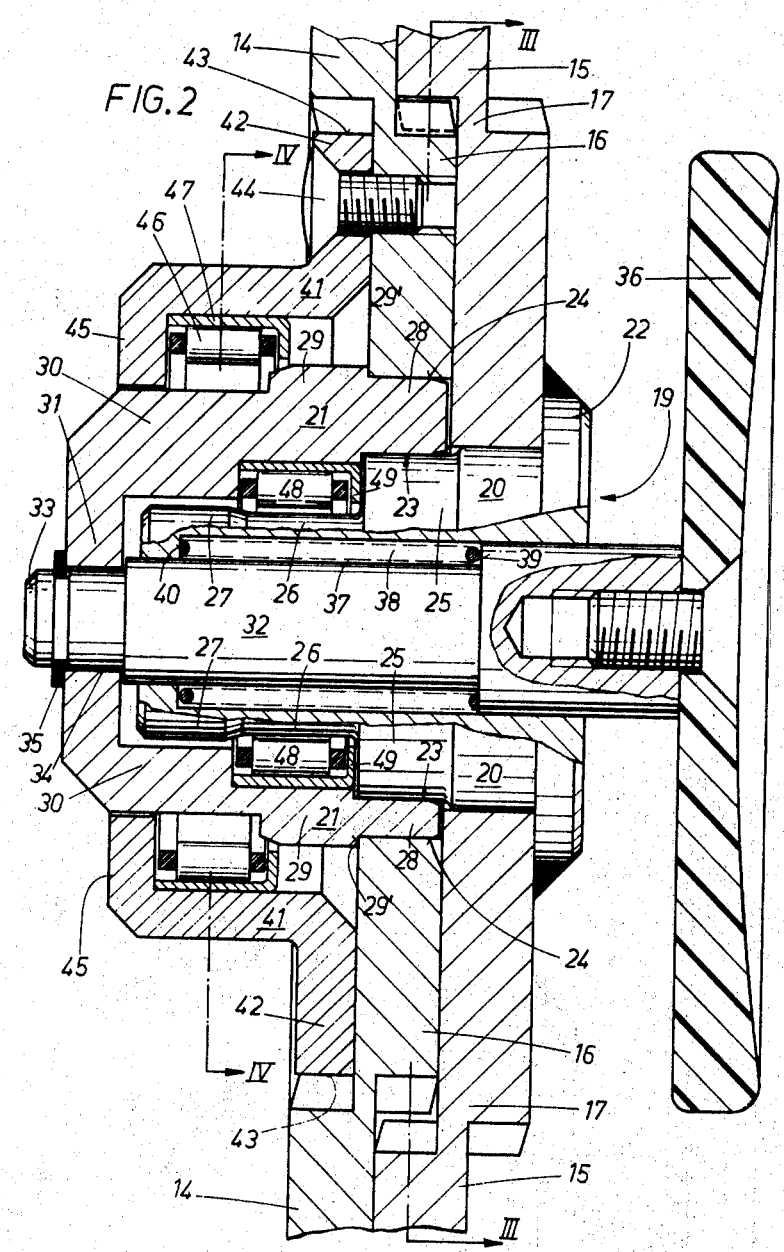
FIG. 2 is a longitudinal section through one hinge fitting, drawn to an enlarged scale, and showing the various elements of the fitting in a position in which the two hinge parts are held stationarily with respect to each other.
Figure 3:
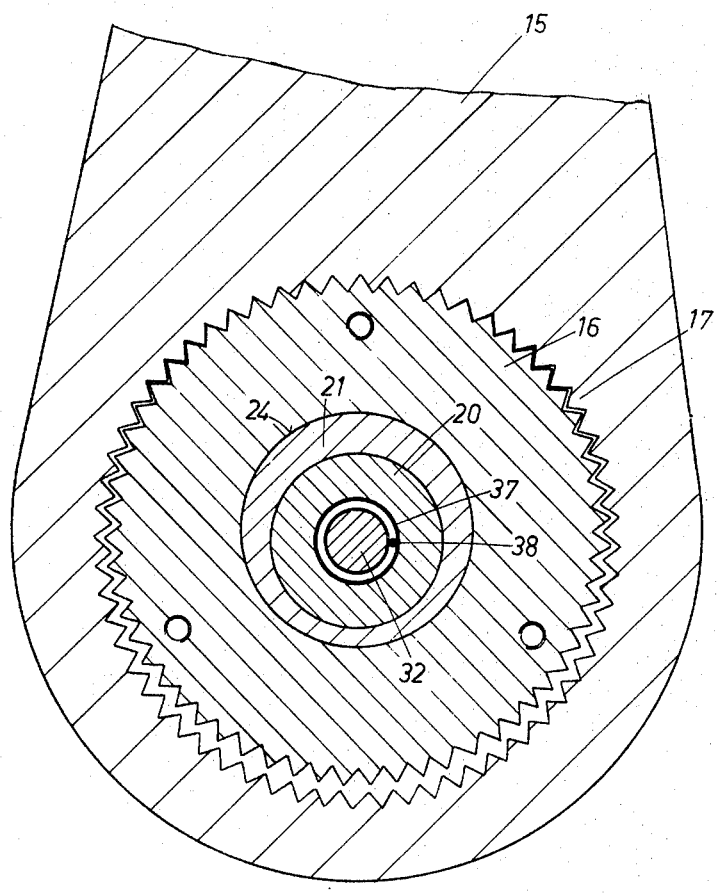
FIG. 3 is a cross-section taken along the line III—III of FIG. 2.

The hinge fitting 12 according to the present invention comprises a stationary hinge part 14 to be connected to the seat portion 10 and a tiltable hinge part 15 which is to be connected to the backrest 11. As shown in FIG. 2, a gear part is fixedly secured to each of the hinge parts, and in the embodiment illustrated in the drawing, a spur gear 16 is integrally connected with the stationary hinge part 14 and an internally toothed gear ring 17 is integrally connected with the tiltable hinge part 15. The two hinge parts 14 and 15 interengage through the gears 16 and 17 with each other. The diameter of the addendum circle or the outer diameter of the spur gear 16 is made smaller by at least the height of one tooth than the diameter of the root circle of the ring gear 17 so that the gears engage eccentrically with each other. In addition, the number of teeth of the spur gear differs by at least one tooth from the number of teeth of the ring gear 17. As the gears roll relative to and in mesh with each other, one of the gears will perform besides the actual turning movement also an eccentric movement, whereby during each full eccentric movement, a turning of this gear ghrough a distance equal to the difference of the number of teeth in the two gears will occur. As shown in FIG. 1, the two hinge parts 15 and 14 are held against axial movement with respect to each other by a holding member 18 connected in any suitable manner to the stationary hinge part 14 and overlapping with an offset portion thereof the hinge part 15. As shown in FIG. 2, the hinge fitting comprises further eccentric means 19 extending through the gears 16 and 17 and having an eccentricity corresponding to the difference between the diameter of the root circle of the gear ring 17 and the outer diameter of the spur gear 16. The eccentric means 19 is composed of two parts, that is a pin 20 and an eccentric bushing 21. The pin 20 is fixedly connected with the ring gear 17 coordinated with the hinge part 15 and the pin extends tightly fitted through a concentric opening provided in an end wall of the gear 17. The pin 20 is provided at one of its ends, shown in FIG. 2 as the right end, with a radially outwardly extending flange 22 which abuts against the outer face of the end wall of the gear 17 so that the axial position of the pin relative to this gear is established, and the flange is fixedly connected to the outer face of the end wall of the gear 17, preferably by a weld seam. Evidently, the axial position of the pin 20 relative to the gear 17 could be also secured in another manner than shown in the drawing and a connection between the pin 20 and the associated gear against rotation with respect to each other is not absolutely necessary for the proper function of the hinge fitting. On the other hand, it is also possible to form the pin 20 integral with the gear coordinated therewith.

The pin 20 of the eccentric extends also through an opening 24 concentrically arranged in the spur gear 16 coordinated with the hinge part 14 but this opening has a larger diameter than the pin portion extending therethrough so that there remains between the pin and the spur gear 16 a free space 23 which, due to the eccentric engagement of the two gears, has likewise an eccentric cross-section. The pin 20 has to the left side of the gear 17, as viewed in FIG. 2, three sections 25, 26 and 27 of different diameters. The eccentric bushing 21 is mounted on the pin 20. The bushing 21 is coordinated with the spur gear 16 connected to jhe hinge part 14 and has an eccentric cross-section, the eccentricity of which corresponds to the eccentric engagement of the two gears. The eccentric bushing 21 is also divided in three sections 28, 29, 30 axially arranged one after the other and having respectively different inner and outer diameters which are arranged in such a manner that the bushing can be moved axially relative to the pin 20. The outer diameter of the section 29 is larger than the outer diameter of the section 28 so as to form at the junction of the two sections an abutment shoulder 29'.

Means are provided for moving the eccentric bushing 21 in axial direction relative to the pin 20 and for this purpose, the pin 20 is formed with a central bore therethrough, and a shift bolt 32 extends through this bore and is guided therein for axial movement. The shift bolt 32 projects with an end portion 33 of reduced diameter through a corresponding opening 34 in an end wall 31 of the bushing 21, and an attaching member 35, for instance a snap ring located in a groove in the end portion 33 of the shift bolt, engages the outer surface of the end wall 31 so that the bushing is held on the shift bolt for movement in axial direction therewith between the snap ring 35 and a shoulder on the bolt 32 at the junction of the end portion 33 with the remainder of the bolt 32. This connection of the bushing 21 to the shift bolt 32 will assure axial movement of the two elements with each other, while the bushing 21 may turn relative to the bolt 32. A disc-shaped operating member 36 is fixedly connected, for instance by a screw, to the end of the shift bolt projecting beyond the flange 22 of the pin 20. The operating member 36 shown in FIG. 2 may also be replaced by an operating lever connected to the shift bolt 32.

Biasing means are provided which bias the eccentric bushing 21 to the position as shown in FIG. 2, in which the shoulder 29' of the eccentric bushing abuts against the left end face, as viewed in FIG. 2, of the spur gear 16. This biasing means preferably comprises a coil compression spring 38 located in the elongated annular chamber 37 provided around a reduced diameter portion of the shift bolt 32 and the spring 38 abuts with its opposite ends respectively against a radially outwardly extending shoulder 39 on the shift bolt 32 and a radially inwardly extending shoulder 40 provided on the pin 20, so that the shift bolt 32 and the eccentric bushing 21 connected thereto is continuously biased to the position as shown in FIG. 2. The hinge fitting comprises further a bearing housing 41 fixedly connected to and axially projecting from the spur gear 16 and substantially encompassing the eccentric bushing 21. The bearing housing 41 is provided with an annular radially outwardly projecting flange fixedly connected by screws 44, only one of which is shown in FIG. 2, to the spur gear 16 and located within a collar 43 formed by the spur gear 16, respectively the fitting part 14 integrally formed therewith. The bearing housing is provided at its end opposite its flange 42 with an inwardly extending end wall 45 which reaches up to the outer periphery of the bushing section 30.

A roller bearing 46 is connected by means of its cage 47 to the inner periphery of the bearing housing 41. An additional roller bearing 48 is connected by means of its cage 49 to the inner periphery of the section 29 of the eccentric bushing 21 so that the two roller bearings are eccentrically arranged with respect to each other. If the bushing 21 is moved by the shift bolt 32 from the position as shown in FIG. 2 to a left end position, the section 29 of the bushing 21 will, with the outer periphery, contact the rollers of the roller bearing 46, whereas the rollers of the roller bearing 48 will come in contact with the outer periphery of the section 27 of the pin 20. At the same time, the section 28 of the eccentric bushing will be moved out of the region of the section 25 of the pin 20 of the eccentric so that in this position, as also shown in FIG. 4, the eccentric bushing 21 will be, on the one hand, in contact through the roller bearing 48 with the pin 20, and, on the other hand, through the roller bearing 46 and the bearing housing 41 with the spur gear 16. In the position shown in FIG. 2, however, the section 28 of the eccentric bushing 21 is in direct contact with the section 25 of the pin and the spur gear 16, whereby it is mentioned that the cross-section of the section 28 of the bushing 21 is substantially equal to the cross-section of the space 23 between the pin 20 of the eccentric and the spur gear 16. In the position as shown in FIG. 2, the roller bearings 46 and 48 are arranged respectively around the section 30 of the bushing and the section 26 of the pin, both of which have reduced diameters so as to be out of contact with the respective bearings.

To facilitate movement of the eccentric bushing 21 in axial direction between the aforementioned described two end positions, the section 28 of the bushing is preferably chamfered at its right end and the section 29 is chamfered at its left end and the pin 20 is also preferably provided with a chamfer between the sections 26 and 27 thereof. Since the eccentric bushing 21 is, in its end position as shown in FIG. 2, in direct contact at its outer and inner periphery with the spur gear 16 and the pin 20 of the eccentric, whereas in the other end position, that is in the position shifted towards the left, the outer periphery of the bushing will be in contact with the roller bearing 46 whereas the roller bearing 48 fixed to the inner periphery of the bushing will be in contact with the outer periphery of the pin 20 of the eccentric, there are provided for the eccentric bushing two separate bearing regions with an essentially different frictional resistance. In the end position as shown in FIG. 2, the friction provided between the outer periphery of the section 28 of the bushing 21 and the spur gear on the one hand and the additional friction provided between the inner periphery of the section 28 with the outer periphery of the section 25 of the pin 20 will be so great that relative movement between the eccentric bushing 21, the spur gear 16, and the pin 20 of the eccentric cannot take place so that any movement of the gears relative to each other will be positively prevented. On the other hand, if the eccentric bushing is axially shifted to its end position toward the left, the outer periphery of the section 29 of the bushing will engage the rollers of the roller bearing 26, whereas the rollers of the roller bearing 48 will engage the section 27 of the pin of the eccentric so that in this bearing region the friction will be reduced to such an extent that the bushing 21 may now easily turn with respect to the bearing housing 41 fixed to the spur gear 16 and also relative to the pin 20 of th eccentric. Due to the now possible relative turning movement of the aforementioned elements, the eccentric bushing 21 can in this position follow an eccentric movement of the pin 20 of the eccentric so that a rolling of the gear ring 15 on the spur gear 16 together with a tilting of the tiltable hinge part 15 relative to the fixed hinge part 14 will be possible. Since the eccentric bushing will thereby follow the eccentric movement of the pin 20 of the eccentric, which corresponds to the eccentric engagement of the two gears, the space 23 between the pin section 25 and the spur gear 16 will remain continuously in the same position so that section 28 of the eccentric bushing can at any time again be moved back into the space 23 to assure thereby without any further delay a blocking of the relative movement of the two gears with respect to each other and therewith a corresponding locking of the two hinge parts in the adjusted position.

It will be understood that each of the elements described above, or two or more together, may also find a useful application in other types of hinge fittings for seats differing from the types described above.

While the invention has been illustrated and described as embodied in a hinge fitting for a seat having a fixed seat portion and an adjustable backrest, especially for seats in automotive vehicles, it is not intended to be limited to the details shown, since various modifications and structural changes may be made without departing in any way from the spirit of the present invention.

Thus for instance the roller bearings 46 and 48 may be replaced by sleeve bearings of small friction. It is also possible to connect the pin 20 of the eccentric with the spur gear and the eccentric bushing with the gear ring 17, whereby the spur gear 16 should be connected to the movable hinge part and the gear ring 17 to the stationary hinge part. It is also possible to construct the gears in a manner different from the manner described, for instance to use a pair of ring gears and a pair of spur gears with different diameters respectively meshing therewith and connecting of each of the hinge parts with a respective one of the ring gears.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A hinge fitting for seats having a seat portion and a backrest, especially for seats of automotive vehicles, comprising a first hinge part to be fixed to the seat portion; a second hinge part to be fixed to the backrest tiltable with respect to said first hinge part; an internally toothed ring gear fixed to one of said hinge parts; a spur gear fixed to the other hinge part and extending through said ring gear in mesh therewith, the diameter of the addendum circle of said spur gear being smaller by at least the height of one tooth than the diameter of the root circle of said ring gear, and the number of teeth of one gear differing from the number of teeth of the other gear; eccentric means cooperating with said gears and comprising a pin fixed to one of said gears and an eccentric bushing turnably mounted on said pin and slidable therewith in axial direction and cooperating with the other of said gears; and means connected to said eccentric bushing for moving the same in axial direction of said pin between a first bearing region with increased friction against turning and a second bearing with reduced friction of turning of said bushing relative to said pin and said other gear.

2. A hinge fitting as defined in claim 1, wherein said one bearing region is formed by a cyclindrical opening provided in said other gear and engaged, when said bushing is in said one bearing region, by the outer periphery of an end portion of said bushing and said second bearing region is formed by a pair of friction reducing bearings, respectively connected to said other gear and said bushing and respectively engaged, when said bushing is in said second bearing region, by the outer periphery of a portion of said bushing adjacent to said end portion thereof and the outer periphery of a portion of said pin.

3. A hinge fitting as defined in claim 2, wherein said bearings are roller bearings.

4. A hinge fitting as defined in claim 2, and including a bearing housing connected to and axially projecting from said other gear, the bearing connected to the other gear being arranged within said bearing housing and connected through the latter to said other gear.

5. A hinge fitting as defined in claim 4, wherein said bearing housing has a radially outwardly projecting flange fixed to said other gear within a collar provided thereon.

6. A hinge fitting as defined in claim 2, wherein said bearing regions are axially displaced from each other through a distance which is greater than the axial length of said end portion and said adjacent portion of said eccentric bushing, respectively.

7. A hinge fitting as defined in claim 6, wherein said end portion and said adjacent portion of said eccentric bushing border on each other and have different outer diameters.

8. A hinge fitting as defined in claim 7, wherein said adjacent portion of said eccentric bushing has a larger diameter than said end portion thereof and forms a shoulder against which said other gear abuts when said bushing is in said first bearing region.

9. A hinge fitting as defined in claim 7, wherein said end portion and said adjacent portion are chamfered at the ends thereof facing away from each other.

10. A hinge fitting as defined in claim 2, wherein said pair of friction reducing bearings comprise an outer roller bearing adapted to engage said eccentric bushing on the outer periphery and having a cage, and an inner roller bearing connected to said bushing on the inner periphery thereof and including a bearing housing supporting the cage of said outer roller bearing and being connected to said other gear axially projecting therefrom.

11. A hinge fitting as defined in claim 1, wherein said eccentric bushing has, at the end of said bushing facing away from said gears, an end wall extending transverse to the axis of said pin, said end wall being formed with an opening coaxial with said pin, and including a shifting bolt extending through said opening and connected to said end wall, and an actuating member fixed to said bolt for shifting the latter and said bushing connected thereto in axial direction.

12. A hinge fitting as defined in claim 11, wherein said pin of said eccentric is hollow and wherein said shifting bolt extends through and with an end portion thereof beyond said hollow pin, and including means connecting said end portion of said shifting bolt to said eccentric bushing turnably with respect thereto and for movement in axial direction therewith.

13. A hinge fitting as defined in claim 11, and including means cooperating with said eccentric bushing for biasing the latter toward said first bearing region.

14. A hinge fitting as defined in claim 13, wherein said biasing means acts on said shifting bolt.

15. A hinge fitting as defined in claim 12, wherein said hollow pin of said eccentric defines about a portion of said shifting bolt an elongated annular chamber, and including biasing means for biasing said eccentric bushing toward said first bearing region, said biasing means comprising a coil compression spring in said annular chamber and abutting with one end against a radially inwardly extending shoulder face formed on said pin and with the other end thereof against a radially outwardly extending shoulder face on said shifting bolt.

16. A hinge fitting as defined in claim 1, wherein said pin of said eccentric projects with an end portion thereof beyond said one gear and is provided at said end portion with a radially outwardly extending annular flange, and a weld seam fixedly connecting said flange to said one gear.

17. A hinge fitting as defined in claim 1, wherein said pin of said eccentric is fixedly connected to that gear which is fixed to said movable hinge part and said eccentric bushing cooperates with the gear fixed to the stationary hinge part.

18. A hinge fitting as defined in claim 1, wherein said ring gear is fixedly connected to said movable hinge part and said spur gear is fixedly connected to said stationary hinge part.

* * * * *

UNITED STATES PATENT AND TRADEMARK OFFICE
CERTIFICATE OF CORRECTION

PATENT NO. : 3,823,440
DATED : July 16, 1974
INVENTOR(S) : Gerd Klingelhofer

It is certified that error appears in the above—identified patent and that said Letters Patent are hereby corrected as shown below:

Column 9, line 14, cancel "therewith".

Signed and Sealed this eleventh Day of May 1976

[SEAL]

Attest:

RUTH C. MASON
Attesting Officer

C. MARSHALL DANN
Commissioner of Patents and Trademarks